Figure 1:
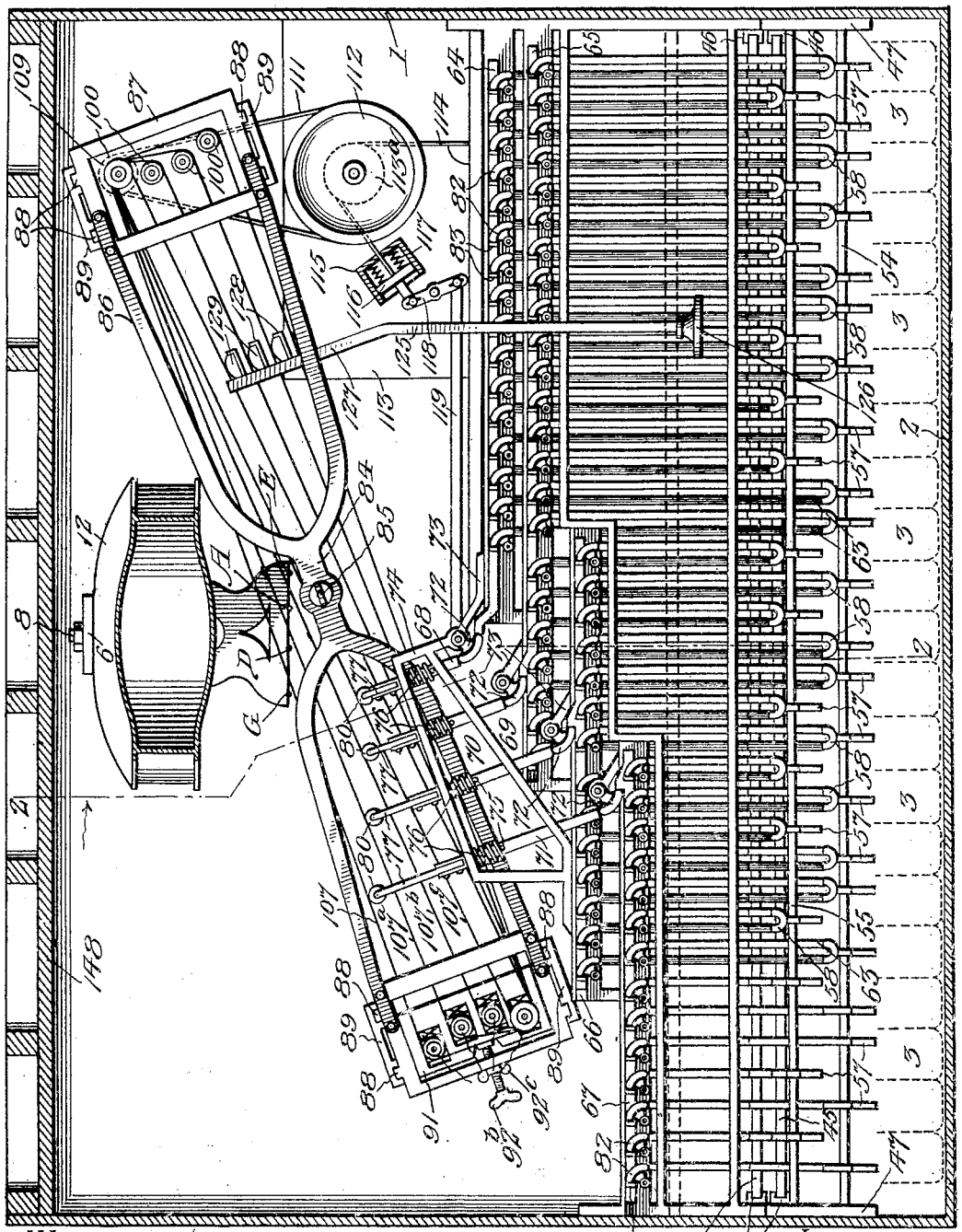

No. 801,106. PATENTED OCT. 3, 1905.
E. RINGER.
VIOL ORGAN.
APPLICATION FILED OCT. 16, 1903.

12 SHEETS—SHEET 1.

WITNESSES:
Edwin F. McKee
C. G. Heylmun

INVENTOR
E. Ringer
BY Victor J. Evans
Attorney

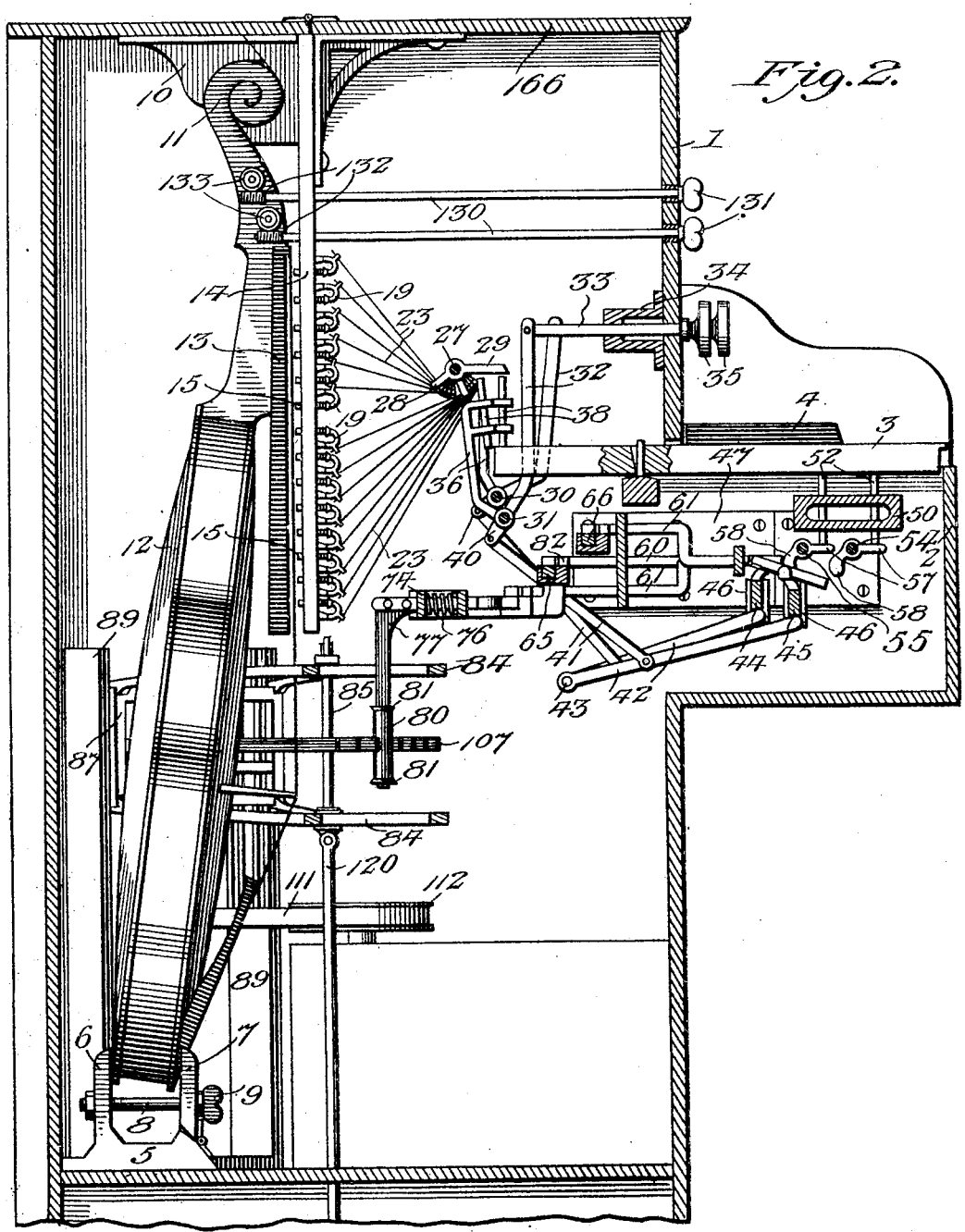

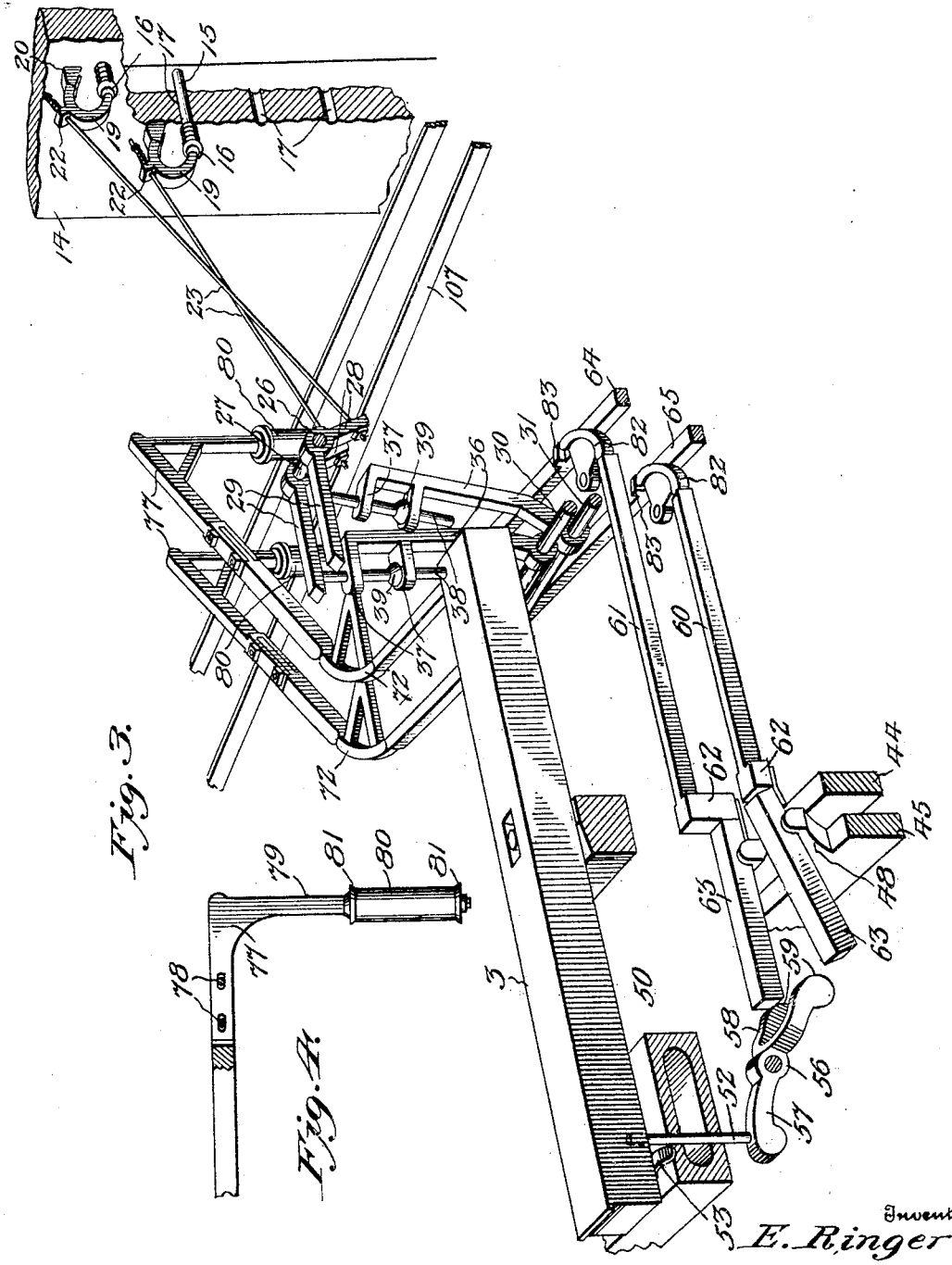

No. 801,106. PATENTED OCT. 3, 1905.
E. RINGER.
VIOL ORGAN.
APPLICATION FILED OCT. 16, 1903.
12 SHEETS—SHEET 4.
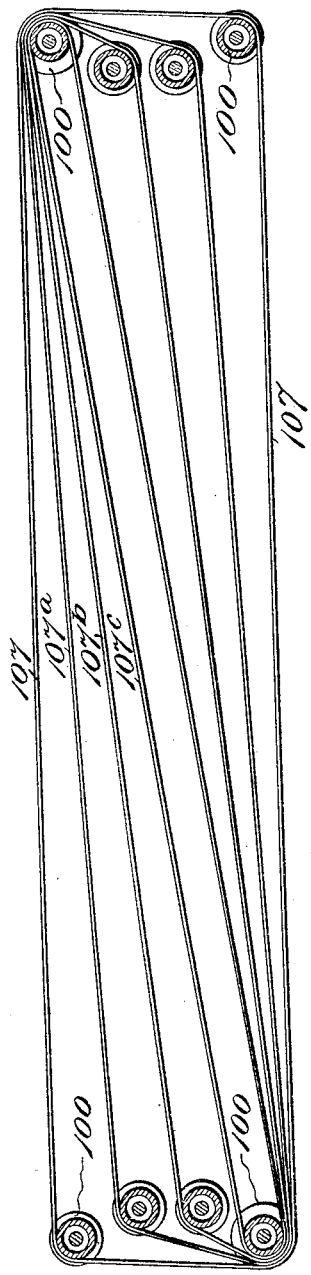
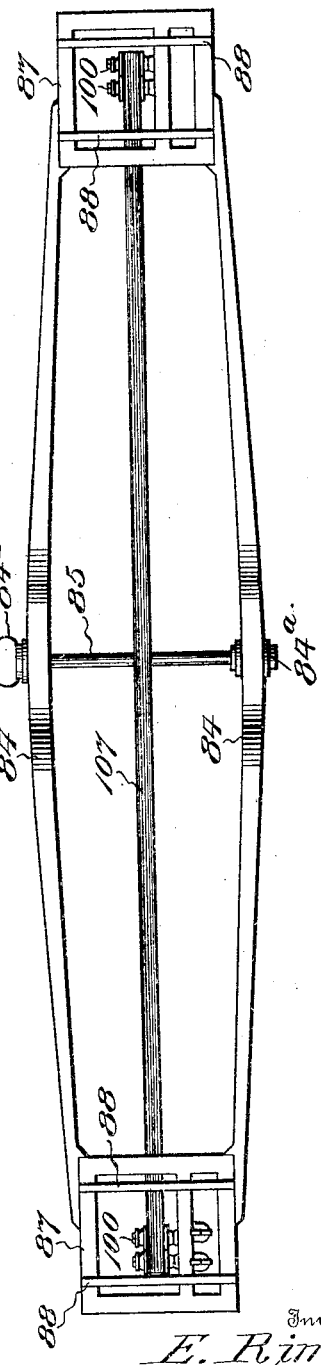
Witnesses
Edwin G. McKee
Inventor
E. Ringer
By Victor J. Evans
Attorney

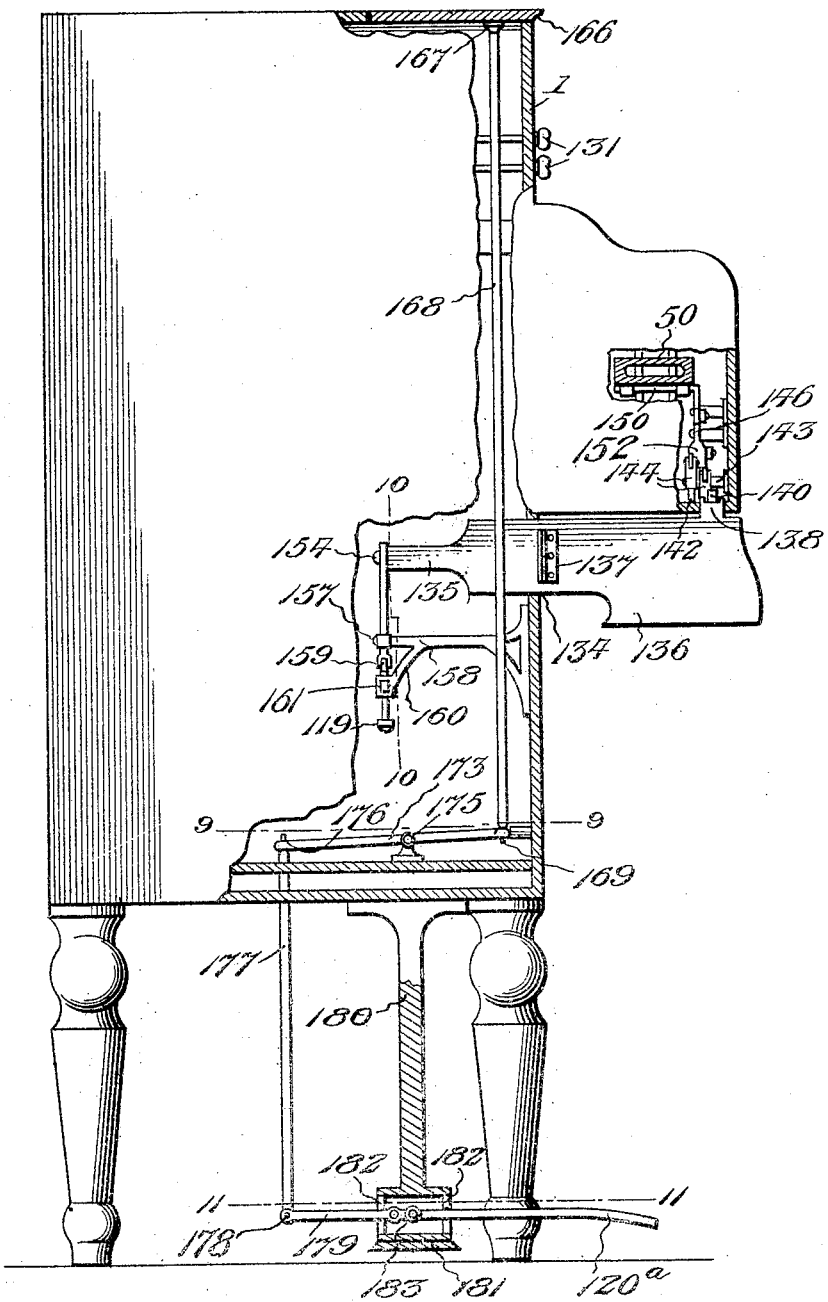

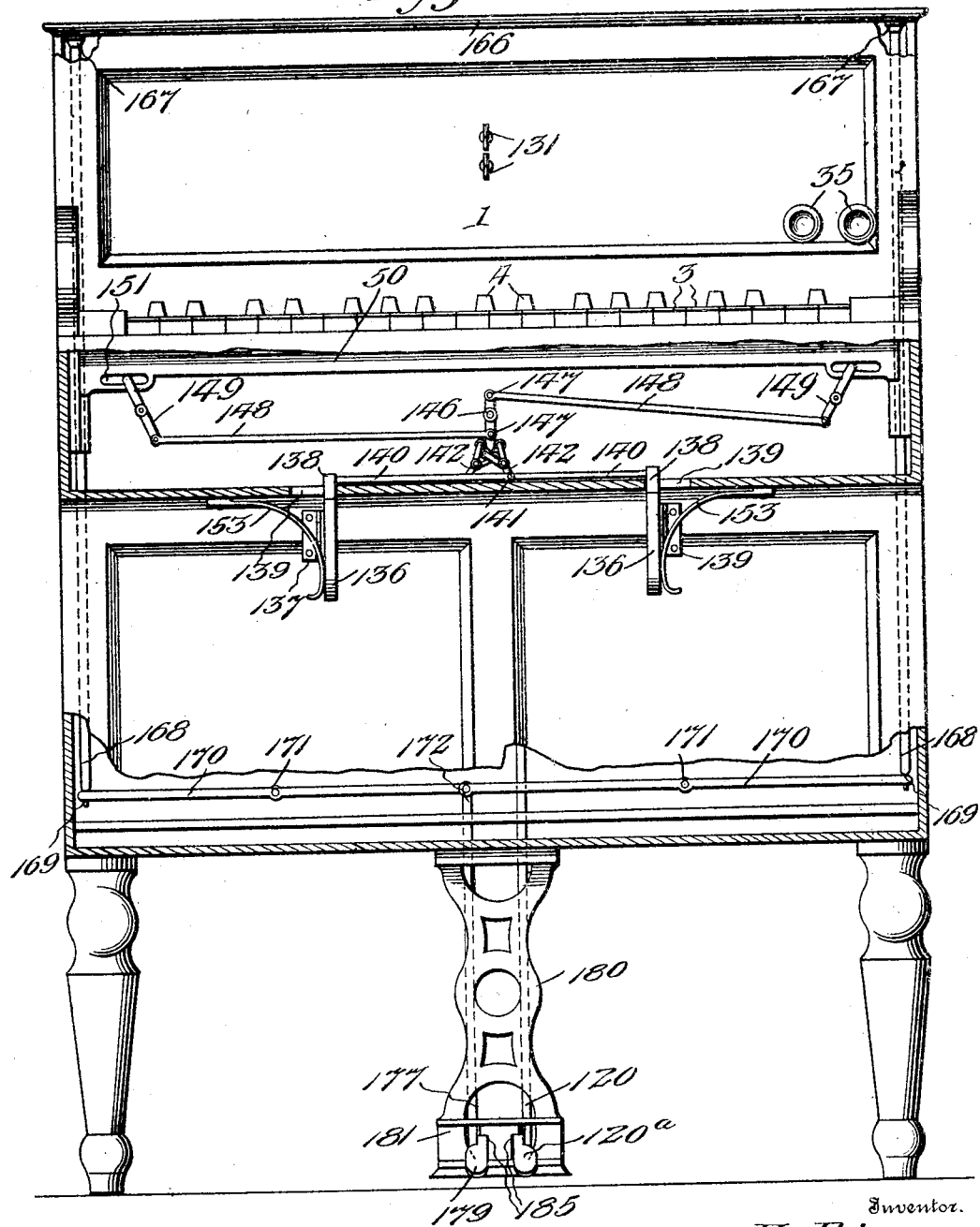

No. 801,106. PATENTED OCT. 3, 1905.
E. RINGER.
VIOL ORGAN.
APPLICATION FILED OCT. 16, 1903.
12 SHEETS—SHEET 7.
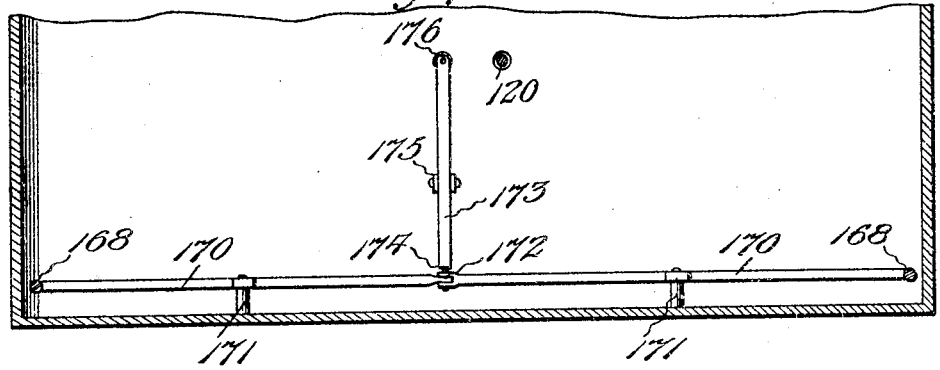
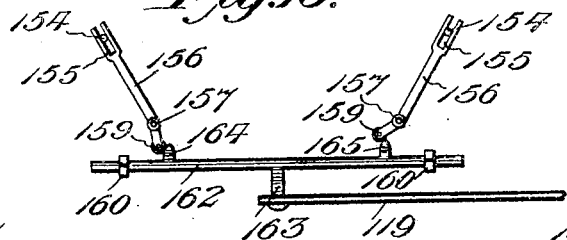
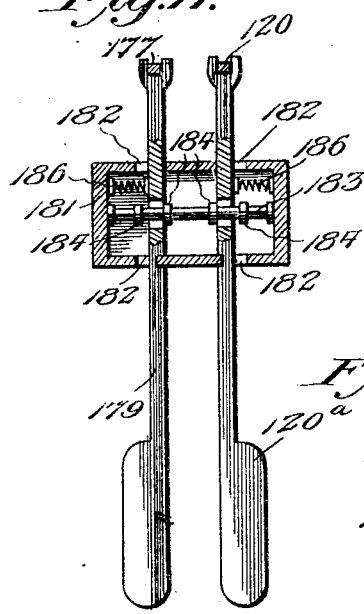
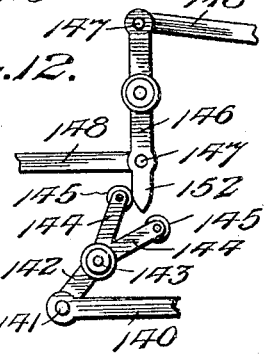
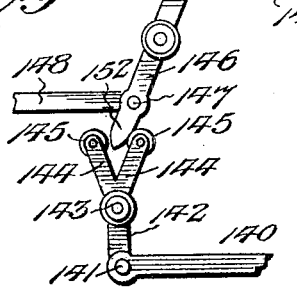
Witnesses
Edwin G. McKee
Inventor
E. Ringer
By Victor J. Evans
Attorney

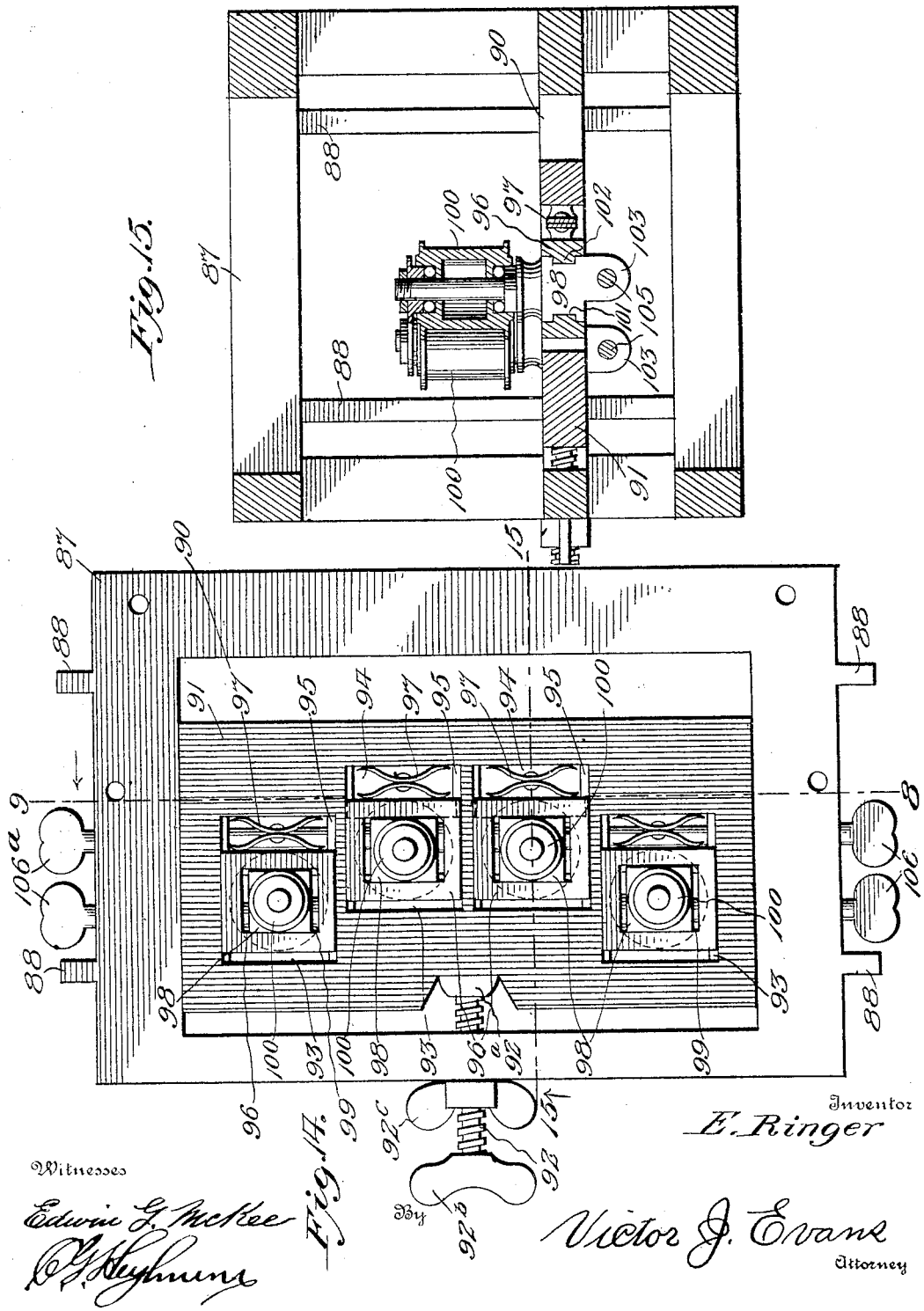

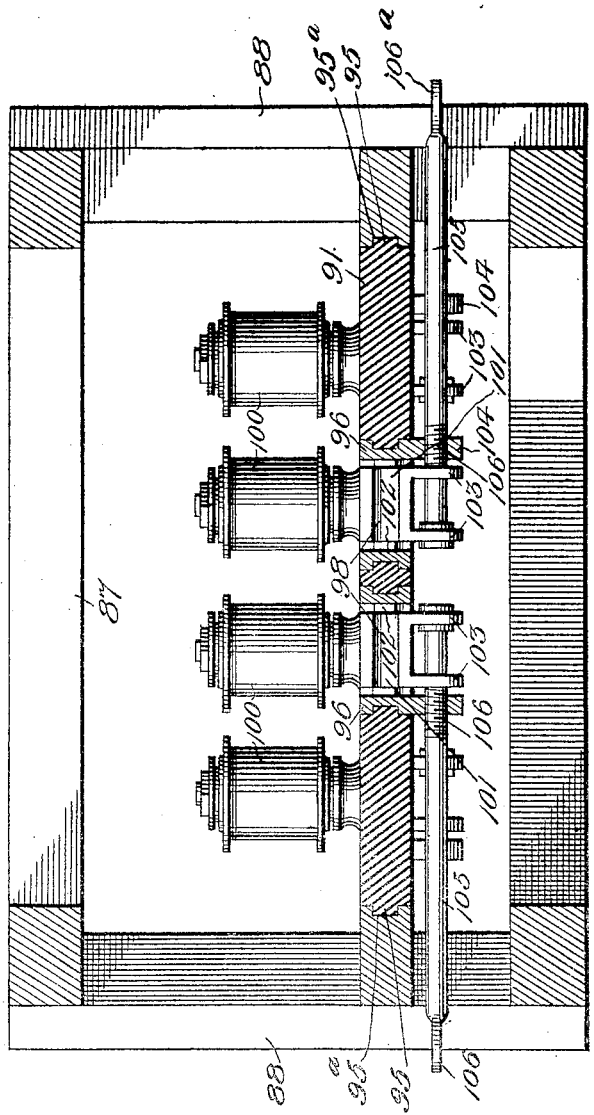
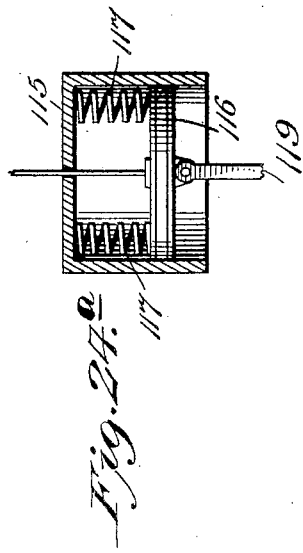

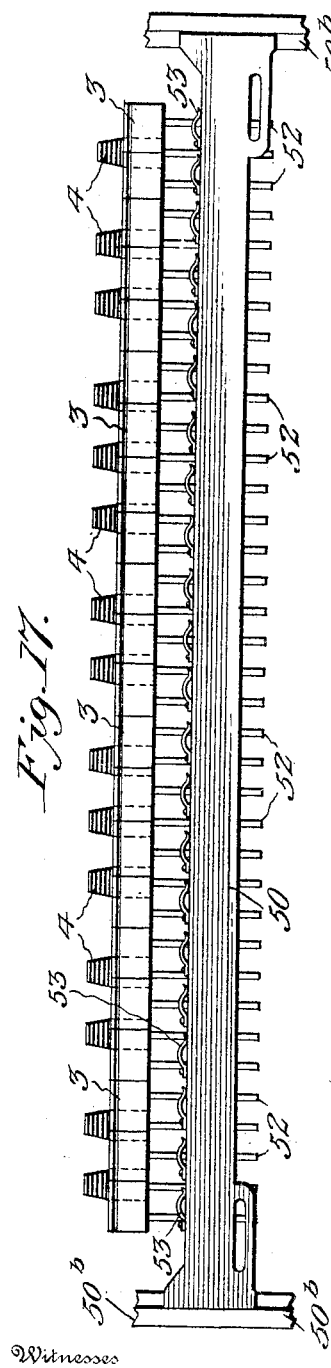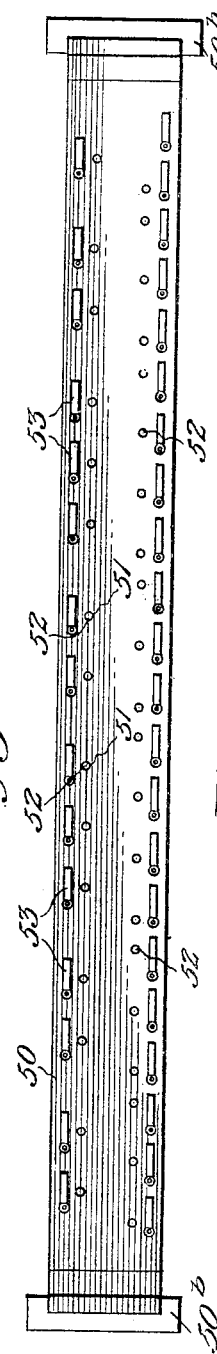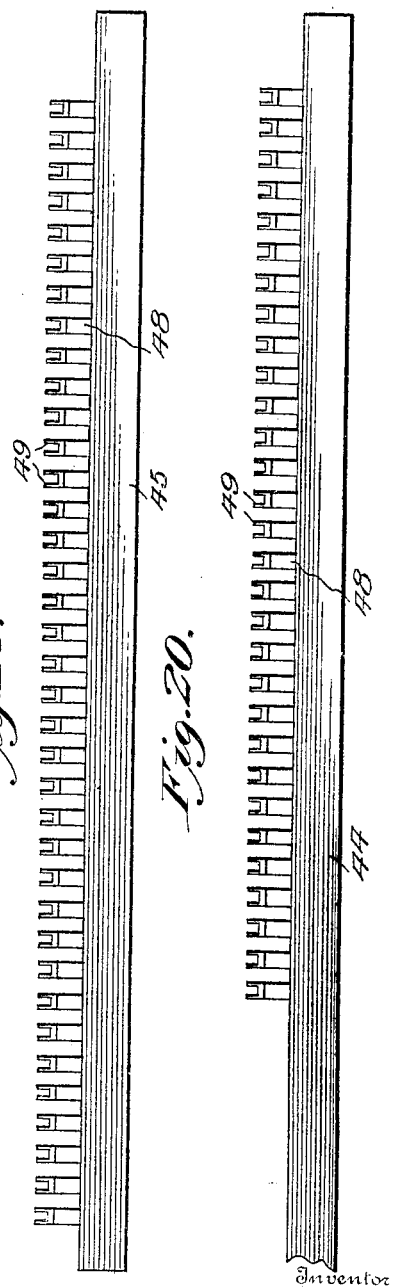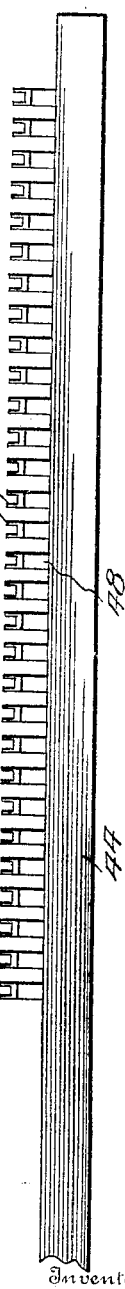

No. 801,106. PATENTED OCT. 3, 1905.
E. RINGER.
VIOL ORGAN.
APPLICATION FILED OCT. 16, 1903.
12 SHEETS—SHEET 11.
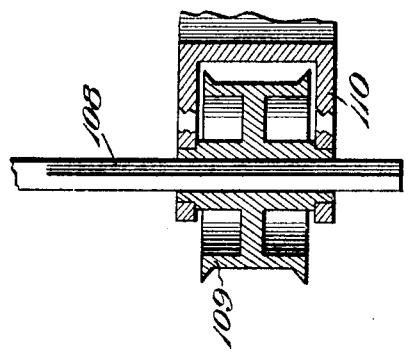
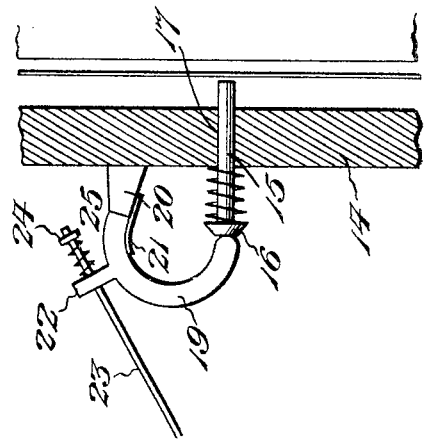
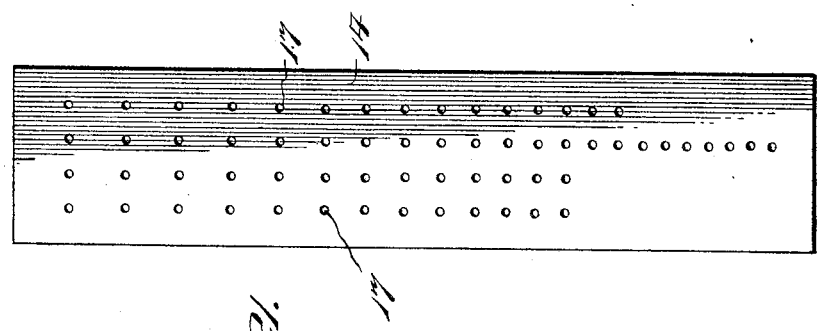
Inventor
E. Ringer
By Victor J. Evans
Attorney
Witnesses
Edwin G. McKee

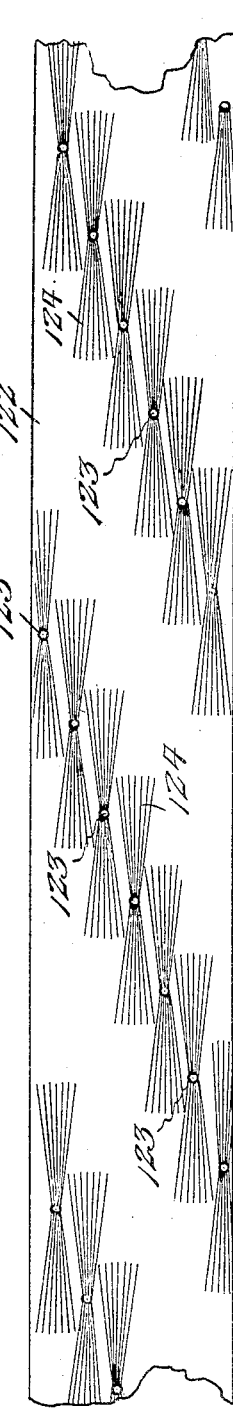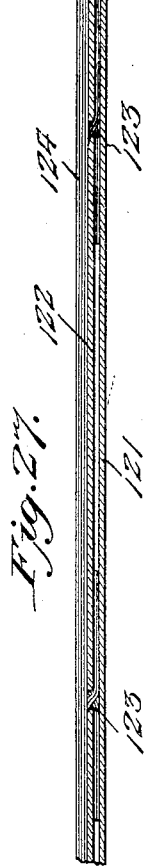

UNITED STATES PATENT OFFICE.

ERNEST RINGER, OF TACOMA, WASHINGTON.

VIOL-ORGAN.

No. 801,106. Specification of Letters Patent. Patented Oct. 3, 1905.

Application filed October 16, 1903. Serial No. 177,342.

*To all whom it may concern:*

Be it known that I, ERNEST RINGER, a citizen of the United States, residing at Tacoma, in the county of Pierce and State of Washington, have invented new and useful Improvements in Viol-Organs, of which the following is a specification.

This invention relates to key-operated musical instruments, and more particularly to the application of a keyboard to stringed instruments that are played with a bow. The organization of contributing elements is based on the principle that the viol tone can only be successfully produced in one way, and that is the method now pursued—namely, by drawing a resined horsehair bow, with motion and pressure properly gaged and controlled, across a viol-string on the usual form of viol-body and its ordinary attachments and appurtenances.

The present improved instrument has the outward appearance of an organ with manual and pedal keyboards, stops, and knee and pedal swells; but in the interior sets of viols, ranging from a small-sized viol to a bass-viol, take the place of sets of reeds and pipes. It is proposed, as just indicated, to use a number of viols at times; but the principle of the invention, as will be hereinafter more fully set forth, is illustrated by the use of a single viol, it being obvious that where a number of viols are used in one instrument it will only be necessary to amplify the parts illustrated.

The mechanism included in the organization of contributing elements is divided into three groups—one for making the sound, another the tones, and the third expression. The first group includes bow-arms—one to each violin-string—each arm being operative by as many movable devices as there are tones to be produced on the string with which said arm coacts, said devices being actuated by depression of the keys of the manual. These bow-arms operate bows to which movement is imparted to bring said bows in contact with the strings of the viol, and the number of bows employed will be the same as the number of viol-strings, and each will have a hair structure simulating the usual violin-bow. Motion is imparted to the bows, which are in the form of continuous belts presenting four members for actuation of the viol-strings, or one for each string.

The second group includes a series of movable elements arranged in close relation to the finger-board of the violin and operative simultaneously with the sound-producing group of devices and controlled by the depression of the keys of the manual.

The third group of elements embodies means for controlling expression and includes devices whereby the movement of the bows may be regulated at will and the pressure of the bows on the viol-strings increased or decreased. This group also includes mechanism for bringing the bows in contact with the viol-strings in normal position relative to the bridge or at a distance from the latter, and the several mechanisms controlling the expression are actuated by the manual through the medium of a depression of the keys of the latter at varying distances, knee-swells, and pedals.

The invention consists in the construction of the various elements and their arrangement and aggroupment in operative combinations, fully described hereinafter.

In the drawings, Figure 1 is a horizontal section through a viol-organ embodying the features of the invention and showing a single viol disposed therein. Fig. 2 is a transverse vertical section on the line 2 2, Fig. 1. Fig. 3 is a detail perspective view of one of the manual-keys, a portion of the bow-arms and bows, and finger mechanism, together with intermediate actuating parts. Fig. 4 is a side elevation, partially in section, of one of the bow-arms. Fig. 5 is a diagrammatic view of the bows of the bowing mechanism, showing them as comprising continuous belts moving over rollers at their opposite extremities. Fig. 6 is an edge elevation of the bowing mechanism. Fig. 7 is a view in end elevation of the viol-organ, partly in section, showing the knee-swells for regulating the pressure of the bowing mechanism on the viol-strings and the motor-brake and also the pedal-operated means for opening and closing the instrument-casing to regulate the degree of sound emitted therefrom. Fig. 8 is a view in front elevation of the viol-organ casing, partly in section, showing the means for regulating the pressure of the bowing mechanism and the mechanism for regulating the degree of sound in front elevation. Fig. 9 is a horizontal section on the line 9 9, Fig. 7, showing the pedal-operated devices in top plan view. Fig. 10 is a sectional view on line 10 10, Fig. 7, showing the means operated by the knee-swells for controlling the movements of the motor for the bowing mechanism. Fig. 11 is a horizontal section on the line 11 11, Fig. 7, showing the construction of the pedals and the means for locking them at determined positions. Figs. 12 and 13 are detail enlarged views of the levers operated by the knee-swells to shift the bow-pressure-regulating means. Fig. 14 is a top plan view of one of the ends of the bowing mechanism carrying one set of rollers for the bowing-belts. Fig. 15 is a view on the line 15 15, Fig. 14. Fig. 16 is a section on the line 8 9, Fig. 14. Fig. 17 is a view in front elevation of the keyboard and the guiding and controlling bar for the keys. Fig. 18 is a top plan view of the guiding and controlling bar. Figs. 19 and 20 are edge elevations of shifting-bars for controlling the strings played by each key of the manual. Fig. 21 is an elevation of a guide and supporting plate adjacent to which the finger-board of the viol is disposed. Fig. 22 is an enlarged detail section through a portion of the finger-support, showing one of the fingers and a portion of a string. Fig. 23 is a sectional view through the driving-pulley for the bowing-belts. Fig. 24 is a plan view of a portion of the securing-lamina of the bowing-belt. Fig. 24ª is a sectional view through a part of the braking mechanism for controlling the speed of the bowing-belts. Fig. 25 is a view showing the arrangement and disposition of the horsehairs on the securing-lamina. Fig. 26 is a view showing the under side of the securing-lamina and the position assumed by the ends of the hairs when applied to the belt and secured thereto. Fig. 27 is a longitudinal vertical section through a completed bowing-belt.

Similar numerals of reference are employed to indicate corresponding parts in the several views.

The numeral 1 designates a casing having a front manual extension 2 and simulating in general appearance and contour an ordinary organ-casing, which may be ornamented or embellished with designs at will and varied in contour without affecting the operation of the mechanisms therein contained. The manual includes the usual complement of keys 3 and 4, representing whole and half tones or naturals and sharps and flats. The keys 3 and 4 will be mounted for depression as in ordinary organ constructions, and instead of sets of reeds and pipes, usual stop-actions, and bellows mechanism the interior of the casing 1 will be occupied by the mechanism hereinafter more fully explained. In the rear part of the casing 1 is a bottom clamp 5, comprising a rigid jaw 6 and a movable jaw 7, both jaws being engaged by a clamping-bolt 8, having a thumb-nut 9, and the movable jaw is adapted to be directly engaged by the said nut. The clamp 5 is accessible from the exterior of the casing through the medium of a slide or door in the back or one end thereof. In the upper part of the casing is a head-support 10, positioned in advance of the vertical plane of the clamp 5, and the said head-support and clamp are adapted to be engaged, respectively, by the head 11 of a violin 12 and the tail portion of the body of the latter, and when the violin 12 is held by the clamp and head-support the strings thereof will be disposed in a true vertical plane, as clearly shown by Fig. 2. It will be understood that the finger-board 13 will also be disposed in a vertical position, and rigidly depending from the top of the casing 1 in close proximity to and in advance of the viol-strings and keyboard is a finger holder or support 14, having therein a plurality of fingers which are vertically alined in operative relation to each of the four strings of the violin.

The number of fingers used in operative relation to each string will correspond in number to the number of tones that can be produced by stopping the strings at various points on the finger-board. The finger-holder 14 is shown in detail in Fig. 21, and the finger construction is clearly illustrated, on an enlarged scale, by Fig. 22. The fingers each comprise a push-pin 15, having an outer head 16 and movable through an opening 17 in the holder 14. Between the head 16 and the holder 14 a spring 18 surrounds the push-pin, which operates to retract the pin after depression of the same. The pin 15 moves loosely in its opening 17, and to depress the same a curved lever or pressure-arm 19 is employed and has its lower free end continually in engagement with the head 16. The upper end of the pressure-arm is movably attached to a fulcrum projection 20, and the downward movement of the arm 19 to effect a depression of the pin 15 is made against a resistance-spring 21, having one terminal secured to the fulcrum projection and the free extremity thereof bearing against the under side of a part of the arm adjacent to said projection. Projecting upwardly from the arm 19 is an apertured lug 22, and movably mounted therein is the upper end of a pull-rod 23, having a stop or nut 24 thereon in rear of the lug and a spring 25 interposed between the stop or lug and the lug 22 to cushion the rod in order to avoid too forceful depression of the pin 15 and set up a fingering operation similar to that where the human hand is used. A part of the pull-rods 23 extends upwardly, and the remaining portion of the same has a downward inclination, as clearly shown by Fig. 2. This reverse inclination of the pull-rods being adopted in order to have them operative by devices supported on a single shaft or rod. The pull-rods 23 are connected at their front ends to bell-crank levers 26, Fig. 3, mounted on a supporting-rod 27, which is suitably held within the casing, said bell-crank levers each having a short arm 28, which normally depends below the rod 27, and a forwardly-projecting long arm 29, which occupies a horizontal position when at rest or in normal position. The rods 23 are attached to the short arms 28, and the springs 25 in addition to their cushioning effect also serve to turn the levers 26 to normal position, when said levers are free to assume such position. Pairs of the levers 26 are operative by each manual-key 3 or 4 in alternation, through features of adjustment which will be presently set forth, to permit each manual-key to produce two tones on the violin or viol strings to provide a greater range of operation without unnecessarily multiplying the manual, and the pull-rods 23, attached to these pairs of levers 26, will control the actuation of fingers engaging different strings so that two unison tones can be produced by each manual-key. Below and in advance of the rod 27 a pair of supporting-rods 30 and 31 is held within the casing under the rear terminals of the keys 3 and 4, and secured to each is an upwardly-projecting lever 32 with pull-rods 33 movably attached to the upper ends thereof and projecting through the front of the casing at a slight elevation above the front of the manual. The said pull-rods are shiftable in a supporting box or bracket 34, projecting inwardly from the front of the casing, and on the outer ends of said rods are heads 35. The rods 33 and their heads are disposed in parallel relation and are at sufficient distance apart from each other to avoid interference. The rods 30 and 31 have a rocking movement, and secured thereto and rising thereabove at regular intervals are upstanding placers 36 adjacent to the rear end of each manual-key 3 or 4, each of the placers having a pair of bearing-arms 37 at the upper end thereof, which are spaced apart from each other and in parallel relation. Movably mounted in the bearing-arms 37 are push-pins 38, having intermediate stops 39 to limit the movement thereof. The extremities of the push-pins respectively project above and below the arms 37, and the placers are in such contiguity to the rear ends of the manual-keys that the lower extremities of the pushers may be alternately thrown over and brought into contact with the upper sides of said rear key ends. The upper ends of the pushers are always disposed under the long arms 29 of the bell-cranks 26, and when the pushers are in vertical position they contact at opposite ends, respectively, with the long arms 29 of the bell-cranks 26 and the upper sides of the rear ends of the manual-keys. By such close arrangement a depression of any one of the manual-keys will sensitively effect an immediate operation of the fingering mechanism, as well as other mechanism, which will be presently set forth. It will be understood that when the rod 30 is actuated through the medium of its pull-rod 33 to throw the placer carried by said rod adjacent to each manual-key all the placers held by the same rod will be simultaneously moved into engaging position relative to the corresponding manual-keys. The same is equally true of the rod 31 and the parts carried thereby.

The rods 30 and 31 have cranks 40 extending downwardly therefrom, and movably attached thereto are the upper ends of connecting-levers 41, having their lower ends pivotally secured to shifting-levers 42, held at their rear ends on a fulcrum device or stud 43. The shifting-levers 42 project upwardly under and at a distance below the manual and are connected to chain-slides 44 and 45, (shown in detail by Figs. 19 and 20,) which are in the form of bars disposed in parallel relation and vertically movable in guides 46, secured to the inner sides of the opposite ends of the casing, as shown by Fig. 1, and carried by a suitably-constructed metal or other frame 47 to support the several operating elements disposed under the manual. The slides 44 and 45 have upwardly-projecting rests 48 arranged at regular intervals and spaced apart from each other, the rests of one slide being disposed opposite the spaces between the rests of the other slide. The upper end of each rest 48 is bifurcated to form a seat 49, and when one slide is elevated by pulling the rod 33 for actuating the same its rests are projected above the rests of the other slide for a purpose which will be presently set forth.

It will be seen from the foregoing description that the tones of the violin or viol may be varied at will by depressing the keys of the manual and produce tones having a pitch corresponding to that of the manual-key in ordinary organ constructions, with the additional advantage that two tones in unison on different strings can be attained by each key.

Beneath the forward extremity of the manual a guide-bar 50 is arranged and has a front and rear series of longitudinally-arranged openings 51 formed therein, the two series of openings corresponding in number to the black and white keys of an ordinary manual complement. The rear series of openings are positioned to correspond to the location of the black keys above, and the front series of these openings are likewise arranged for the white keys. Movably mounted in both series of opening are key-pins 52, secured at their upper ends to the black and white keys of the manual, and to reduce the friction on the several pins and render their operation more sensitive the guide-bar 50 is formed hollow, as at $50^a$. The pins 52 are long enough to project a considerable distance below the under side of the bar 50, and the length of the pins will be determined by the general proportions and arrangement of the parts with which they coöperate. Arranged on the bar 50 in advance of the front series of openings and back of the rear series of openings are springs 53, equal in number to the keys above and permitting the said keys to be depressed to a normal low position without restriction, but under certain conditions, which will be hereinafter explained, allow the keys to have a greater depression imparted thereto. The ends of this bar 50, as above described, are slidably disposed in grooved guide-plates 50ᵇ, secured upon the end pieces of the instrument-casing, the said bar 50 being vertically movable and adjustable in the guide-plates in order to increase and diminish the distance between it and the under side of the manual-keys, so as to regulate the distance the keys may be depressed, and the pressure of the bows on the strings be controlled to increase or decrease the volume of sound. A means is provided for raising and lowering this bar 50, which means will be fully described hereinafter.

In advance of the slides 44 and 45 and under the guide-bar 50 two rods 54 and 55 are mounted and held at their ends in the frame 47, and on the said rods independent series of wipers 56 are rotatably mounted and are equal in number to the pins 52, carried by the manual-keys, the front series of wipers being operated by the white keys of the manual and the rear series by the black keys. The wipers each comprise an outer or front contact projection 57, having its upper edge always in contact with the lower end of the adjacent pin 52. The rear extremity of the wipers is bifurcated to form a yoke 58, and the rear ends of the arms of said yoke are rounded, as at 59, for a purpose which will be presently set forth. By depressing any one of the manual-keys the pin 52 thereof will bear downwardly on the front projection 57 of the wiper 56 beneath the same and the rear yoked extremity 58 will be thrown upwardly.

Each key of the manual is arranged to operate two members of the bowing mechanism which will be presently described, and in view of the large number of motion-transferring devices necessary to accomplish this result such motion-transferring devices are grouped in pairs in relation to each key, and one device is above the plane of the other; but all of one level are parallel throughout the entire series. In other words, the higher motion-transferring devices of the several pairs operative by the individual manual-keys are normally disposed in the same horizontal plane, as are also the lower devices of the pairs. These motion-transferring devices for each key consist of two transversely-extending bars 60 and 61, which are freely slidable on portions of the frame 47, arranged thereunder. The bars 60 and 61 have front terminal enlargements or heads 62, that of the upper bar 61 being larger and having a greater dependence than that of the bar 60. To the heads 62 of each pair of bars 60 and 61 actuating members 63 are hinged and rest in the seats 49 of the slides 44 and 45, the outer ends of the actuating members being so disposed that they may be brought into contact with the rear rounded terminals of the arms of the yoke 58, forming a part of the wiper 56.

When one slide is raised, it brings the actuating member 63 carried thereby up into horizontal position and in engagement with the nearest arms of the yoke 58, and if the other slide be lowered its actuating members 63 or the members controlled thereby will be permitted to lower or fall out of engaging positions with relation to the remaining arms of the yokes, and hence one tone of a certain pitch only will be produced by a depression of the keys affected by such adjustment. It is obvious that both actuating members 63 may be thrown up into operative relation to the yoke of the wiper under each key, and likewise both placers 36 may be thrown over the rear end of the same key or the series of keys to obtain two unison tones to each key. The motion-transferring devices set forth coöperate with bow-shifters in the form of longitudinally-sliding bars 64 and 65. These bow-shifters are arranged in series to correspond with the range of tone having different pitches that can be produced by properly fingering or stopping the four strings of a viol or violin. There are at least four of these bow-shifters employed, and the one bearing the reference-numeral 64 is situated farthest to the rear and operative by the extreme upper-register complement of keys of the organ to control the first or E string of the viol or violin. The second bow-shifter (numbered 65) is operative by the same keys in the manual controlling the operation of the shifter 64 to produce the unison effects that may be desired in solo work, for instance, and also by additional keys in the middle register of the manual to obtain the full number of positions and pitch effects of the second or A string of the viol or violin. The third bow-shifter or bar 66 is arranged for actuation by the keys of the manual in the middle register and a portion of the bass-keys to obtain the full-tone variation of the third or D string of the viol or violin. The fourth shifter or bar 67 is operated by the keys of the manual in the bass-register solely, and it will be understood that the motion-transferring devices controlled by the keys of the manual within a very low range in the bass will not be in pairs; but each key will control one of such transferring devices. The shifter 67 regulates the member of the bowing means for sounding the fourth or G string of the viol or violin. The shifters 64, 65, 66, and 67, respectively, actuate bow-arms 68, 69, 70, and 71, disposed at an angle to each of said shifters, and between the terminals of the shifters and bow-arms horizontally-positioned segments 72 are interposed, the said segments being fulcrumed at their reduced ends on supports or bracket-arms 73, projecting from portions of the frame 47. The bow-arms 68, 69, 70, and 71 are slidable in a skeleton frame 74, secured to the rear portion of the frame 47, and surrounding a portion of each arm between a pin or stud 75 thereon and the rear side of the frame 74 is a spring 76, which operates to return the arm to its normal position. The arms 68, 69, 70, and 71 are of different lengths for a purpose which will presently appear, and each has an angle extension 77 adjustably secured thereto by bolts or pins 78. On the depending member 79 of each angle extension an elongated vertically-arranged roller 80 is mounted and has flanges 81 at its upper and lower ends. These bow-arms, with their extensions and rollers, operate in conjunction with portions of a bow or bowing element to deflect or distend and bring said portions in contact with the several strings of the viol or violin in response to the actuation of the keys of the manual controlling the several individual bow-arms. It is obvious that to effect a shifting movement of the several bow-shifters or sliding bars 64, 65, 66, and 67 through the medium of the motion-transferring devices actuated by the keys of the manual some intermediate mechanism must be employed in view of the fact that the motion-transferring devices are in planes at right angles to the bow-shifters. For this purpose a horizontally-disposed segment 82 has one terminal of its enlarged extremity continually in contact with the rear end of one of the bars 60 or 61 and its opposite end in continual contact with an upwardly-projecting shoulder or stop 83 on the shifting bar with which it coöperates. The segments 82 are equal in number to the motion-transferring devices operating in connection with each bow-shifter, and the number of upstanding shoulders or stops 83 will be similar. The segments 82 are fulcrumed on portions of the frame 47 adjacent to the several bow-shifters and are all of uniform dimensions and have the same relative position to move the shifters from right to left when the keys of the manual are operated. By depressing the keys of the manual within the scope of actuation of the bow-shifters the latter will be moved without lost motion to individually actuate the bow-arms with which they coöperate, and thereby produce sound from the individual strings of the viol or violin which will be pitched as to tone by the simultaneous operation of corresponding fingers engaging the viol or violin strings through the medium of the placers 36.

The bowing or sound-producing mechanism comprises upper and lower horizontally-disposed frames 84, mounted on a post 85, extending through the center thereof. These frames 84 are arranged at an oblique angle within the casing to give a proper inclination of the bowing element with relation to the viol-strings, and each comprises opposite yoked or U-shaped extremities 86, terminally connected to opposite end bearing-frames 87, having pairs of end lugs 88, engaging guide-frames 89, disposed at diagonally opposite points in the rear portion of the casing 1. The frames 84 are composed of resilient metal members which are bowed slightly from their central portions toward their extremities and are so mounted upon the post 85 that they may be compressed toward each other or allowed to expand in order to permit the tension of the bowing bands or belts carried thereby to be adjusted. This adjustment is accomplished by rigidly mounting the lower frame on the standard, as at 84ª, and movably arranging the upper frame and providing an adjusting-nut 84ᵇ on the threaded upper end 85ª of the standard above the upper frame by means of which nut 84ᵇ the movable frame may be forced toward the stationary one, which action straightens the frames to increase the tension on the bowing-bands, or by permitting the movable frame to spring away from the stationary frame they will be allowed to assume a more curved position to reduce the tension. The end frames 87 are vertically movable in the guide-frames 89, and, as clearly shown in Figs. 14, 15, and 16, the frames 87 are substantially rectangular and are formed with rectangular openings 90, in which are mounted, one in each, bearing-plates 91. The bearing-plates 91 are slidable in the frame and are rendered adjustable longitudinally thereof by means of an adjusting-screw 92, threaded through the end member of the frame 87 and swiveled at its inner end to the said plate in any suitable manner, as at 92ª, said screw being provided with an operating-handle 92ᵇ at its outer end and with a winged jam-nut 92ᶜ, which is adapted to abut the end member of the frame to rigidly hold the bearing-plate in the position to which it may be adjusted by the screw 92. Each plate has a slot 93 therethrough near its opposite ends and intermediate slots 94, the said slots 93 and 94 having supporting-flanges 95 along their side walls which project into slots 95ª in journal-plates 96, between the inner edges of which and the inner end walls of the slots 93 springs 97 are arranged and secured in permanent positions to resiliently resist longitudinal movement of the individual journal-plates. These journal-plates 96 have journal-blocks 98 adjustably mounted therein, the said plates being slotted, as at 99, to receive said blocks, and from the latter flanged rollers or pulleys 100 project upwardly, said pulleys being four in number at each end of the frame 84. As before indicated, the plate 91 is adjustable, and by its movement all of the journal-plates 96 and journal-blocks 98 are simultaneously moved in the same direction; but in addition to this unitary adjustment the journal-blocks 98, near the ends of the plate 91, and the intermediate journal-blocks are adjustable in planes at right angles to the adjustment of the plate 91. As clearly shown by Figs. 14 and 15, the blocks 98 have opposite end grooves 101, which receive corresponding flanges 102 in the journal-plates 96, and depending from the blocks 98, near the ends of the plate 91, as well as from the intermediate blocks, are lugs 103 and 104, engaged by adjusting-rods 105, having their inner ends swiveled in the lugs 103, and screw-threaded portions 106 engaging the lugs 104. Each journal-block 98 has one of the adjusting-rods coöperating therewith, and the outer ends of said rods are formed with turn-heads 106ª, simulating a thumb-nut head, whereby the several blocks 98 may be shifted to change the spaced relation of the same with reference to each other. The pulleys 100 carry continuous bowing-belts which are propelled continuously in one direction and are moved into engagement with the strings of the instrument to produce the desired musical effect. These bowing belts or bands are four in number and are arranged as follows: The band or belt 107 for engaging the string E of the violin is arranged around the front and rear pulleys of each set at the opposite ends of the bow-frame. The belt 107ª for the A-string passes the first and third of the pulleys at the right of the frame and the second and fourth at the left; the belt 107ᵇ for the D-string, the first and second at the right and the fourth and third at the left; the belt for the G-string, the first pulley at the right and the fourth at the left. By this arrangement it will be clearly seen from Fig. 5 of the drawings, and also Fig. 1, that the bands are spaced apart from each other and that the movement of one in no way interferes with the movements of the others. The belts are arranged in this manner to reduce the operative mechanism therefor and position four portions thereof in close proximity to the strings of the viol or violin. Motion is imparted to these bowing-belts from the innermost pulley 100 at the right, though it could be equally well applied to either one of the other end pulleys. The shaft 108 of the innermost end pulley at the right is extended downwardly and is formed angular in cross-section, as clearly shown by Fig. 23, and thereon is mounted a drive-pulley 109, held at a suitable elevation by a bracket 110, secured to a part of the guide-frame 88 or supported in any other suitable manner. This drive-pulley 109 is surrounded by a belt 111, running from a motor-pulley 112 on the upper end of a motor-shaft actuated by any suitable form of motor inclosed in a case or housing 113 in the lower portion of the casing 1. The motor-pulley 112 is of considerably larger dimensions than the drive-pulley 109 to obtain the necessary speed of bowing-belts 107, and to control the expression of the tones evolved from the strings of the violin by contact therewith of the belts and to regulate the volume to some extent it will be understood that means must be provided for braking or regulating the speed of rotation of the motor-wheel 112, and for this purpose the shaft on which the motor-wheel 112 is mounted also has a brake-wheel 113ª secured thereon, which is engaged by a brake-strap or band 114, fastened at one end to the rear portion of the frame 47 and having its opposite end movably extending through the one end of a piston chamber or housing 115, in which a piston 116 is movably mounted and has the adjacent end of the band 114 attached thereto. Between the piston 116 and the end of the chamber or housing 115 nearest the motor-pulley 112 metallic springs 117 are interposed which operate to draw the piston into normal position and slacken the band 114 to relieve the resisting tension thereof in relation to the brake wheel or pulley 113. Connected to the piston 116 is one end of an intermediately-fulcrumed lever 118, and to the opposite end of said lever 118 a connecting-rod 119 is attached, which at its free end is connected to a means to be fully described hereinafter, by which it is operated to apply the brake whereby the performer may readily control the movement of the bowing-belts 107, and variations in tone, intensity, and quality may thus be readily controlled to conform to the marks of expression indicated by the music executed. As clearly shown by Fig. 1, the rear portions of the four belts 107 are arranged at an angle between the strings of the viol or violin above the bridge of the latter and are held in continual contact with the rollers 80 on the depending members of the angle extensions 77 of the bow-arms 68, 69, 70, and 71, so that when the said bow-arms are moved by the operation of the manual-keys, as heretofore explained, the portions of the bowing-belts engaged thereby will be instantly brought into contact with the strings of the viol or violin with which they are intended to operate. The adjustable features heretofore explained in connection with the plates 91 and journal-blocks 98 are intended to maintain the bowing-belts 107 at the necessary degree of tautness and hold the rear portions of said belts in proper spaced relation and in the desired proximity to the strings of the viol or violin. The springs 97 are employed in order to permit the portions of the belts engaging the viol or violin strings to have sufficient yielding movement or elasticity to obtain the delicate touch of the rear belt portions in relation to the strings of the viol or violin under normal tension conditions and to avoid too harsh bearing of the belt portions on the strings.

It will be understood by those acquainted with violin execution that it is necessary to produce certain tone effects to shift the bow closer to or farther from the bridge of the viol or violin relatively to a normal plane of position of the bow on the strings. To meet this requirement, the frame 84, which comprises upper and lower duplicate members of similar structure, is arranged for vertical movement in the guide-frames 88, and to obtain this result an adjusting-rod 120 is connected to the lower part of said frame 84 and projects downwardly through the lower portion of the casing 1 to the front of the latter and attached to a pedal 120ª, pivoted to a support in a manner to be hereinafter described. By applying different degrees of pressure to this exterior pedal controlling the rod 120 the frame 84 may be raised at intervals to cause the bowing-belts to contact with the strings of the viol or violin at varying distances from the bridge of the latter, and by releasing the pedal connected to the rod 120 the frame 84, carrying the bowing-belt, will immediately gravitate to normal position.

The bowing-belts 107 can be constructed in many different ways to arrive at the result sought; but to closely approximate the ordinary horsehair bow it is preferred that it be constructed as clearly shown in detail in Figs. 24, 25, 26, and 27, wherein it will be seen that said belts are composed of a backing-lamina 121 and a securing-lamina 122, the latter of which at regular intervals is formed with transverse oblique lines of openings 123, through which horsehairs 124 are threaded in reverse directions and extend longitudinally over the upper side of the lamina 122, the ends being spread on the back of the lamina 122 and secured in place by the backing-lamina 121, which is cemented to the under side of the lamina 122. The hairs are arranged on the bands by threading a needle with a strand of hairs, as $a$ in Fig. 25, which have been cut to a desired or proper length, which strand is passed up through one of the openings 123 from the under side of the band and is then carried downwardly from the upper side of the band through one of the openings 123 at a considerable distance from the one first filled. This operation is repeated until all the openings in a line are filled, when those in the next line are similarly filled with a strand $b$, the terminals of the hairs being threaded through the set of openings following those which received the preceding strands until the surface of the band is entirely covered. This operation is continued with strands $c$ and $d$ until the proper thickness of hair is provided. By this arrangement it will be seen that the weaving of the hairs is so close and the breaks or spaces between the meeting ends of the strands are so well covered that a smooth, even, and uninterrupted surface is provided. The horsehairs 124 are closely arranged, as shown by Fig. 27, and the width of the belt is approximately that of an ordinary violin-bow, though the proportions may be varied to meet different contingencies. It is essential, however, that the pulleys over which the belts run be spaced a sufficient distance apart to arrange each belt in stretches of such length that the operating portion or stretch adjacent to the strings of the viol will constitute, in effect, a continuously-movable linear (comparatively long and narrow) bow of proper length to extend in opposite directions past the coacting string the requisite distance to permit of its free distention or deflection out of its normal path to bring it into engagement with the string under the action of the coöperating bow-shifter without undue resistance or tendency to vibrations producing discordant sounds. The frame 84 is primarily adjusted to dispose the belts in proper position of closeness to the strings of the viol or violin, and by having the angle extensions 77 adjustable on the bow-arms the rollers 80 can be moved to bring them into contact with the four belts which engage the strings, the said rollers depending between the belts, as clearly shown by Fig. 1. A resin-applying attachment is also used in connection with the bowing mechanism and consists of a pull-rod 125, which is projected through the front of the casing and has an outer head or knob 126 and a rear angular deflected extremity 127, carrying a series of holders 128, in which blocks or pieces 129 of resin are clamped in proper position to engage the horsehair face of the belt 127. By properly moving the rod 125 the blocks or pieces of resin 129 are brought into contact with the belts and allowed to remain in such position until the belts have been thoroughly treated with resin. After the resin has been applied the rod 125 is moved in the opposite direction to clear the blocks or pieces of resin from the belts. The operation of applying the resin is carried on while the belts are moving, or, in other words, the motor is started after the blocks or pieces of resin have been adjusted in contact with the belts. An attachment is also provided for tuning the violin-strings and consists of tuning-rods 130, projected through the front of the casing 1 above the manual and having exterior heads 131. The rear ends of the rods 130 are provided with worms 132—one on each—which engage worm-gears 133 on the ends of the tuning-pegs. It is obvious that by turning the rods 130 the strings of the violin or viol may be regularly tuned and during such operation the keys of the manual arranged to bring the bowing-belts in contact with the strings.

The means for raising and lowering the key-stop bar 50 and for operating the brake for the motor will now be described. In the front wall of the casing for the instrument are formed vertical openings 134, and projecting through said openings to a point within the casing are extensions 135 of knee swells or levers 136, said openings and levers being spaced a proper distance from each other and the levers being hinged to the front wall of the casing, as at 137. At a point adjacent their outer ends the knee-swells are provided with vertical extensions 138, which extend upwardly through openings 139 in the bottom of the manual extension. To the end of each of the projections 138 is pivotally attached one end of a connecting-bar 140, the opposite ends of said bars overlapping each other and being pivotally connected, as at 141, to one end of a lever 142, the levers 142 being fulcrumed upon studs 143, secured within the casing. The upper portions of these levers 142 are provided with diverging arms 144, in the ends of which are rotatably mounted rubber rollers 145, which reduce the liability of disagreeable sounds. Pivotally mounted within the manual extension at a point midway between the fulcrums of the levers 142 is a rocking lever 146, to the opposite ends of which, as at 147, are pivotally connected pull-rods 148, the opposite ends pivoted to the lower ends of swinging levers 149, the upper ends of the latter being provided with lateral projections 150, extending into horizontal slots 151 in the bar 50. The lower end of the rocking lever 146 is extended for a distance below the point of its connection with the rod 148, as at 152, and is arranged between the arms 144 of the levers 142, the extension 152 being flattened, so as to be engaged by the arms of both of said levers, which, it will be seen, overlap each other when swung on their fulcrums to swing said lever 146 to raise and lower the bar 50. To raise the bar 50, the knee-swell to the right of the instrument, referring particularly to Fig. 8, is swung on its hinge, which action pulls upon the connecting-rod 140 and throws the lever 142 connected thereto to the left, the arms of said lever engaging the lower end of the lever 146 to swing it to the right, which will push the rods 148 laterally and outwardly in opposite directions, thereby swinging the levers 149 to raise their upper or free ends, which slides the bar 50 upwardly upon the guides therefor, which brings said bar closer to the keys, and correspondingly restricts the depression of the keys to decrease the pressure of the bow-bands on the viol or violin strings. The knee-swell above mentioned being released is returned to its normal position by means of a spring 153, secured to the casing and engaging said knee-swell. The bar 50 is lowered by the swinging of the left knee-swell to the left, which, through the rod 140 connected thereto and associated lever 142, swings the lower end of the rocking lever 146 to the right, which movement of the lever 146 exerts a pull on the rods 148, thereby drawing them inwardly and swinging the levers 149 in the opposite direction to that previously described to lower their upper or free ends, which eventuates in the lowering of the bar to a point farther from the keys, thereby allowing the keys to be depressed to a greater extent, so as to increase the pressure exerted upon the strings by the bowing mechanism, and consequently the intensity of the volume of sound given off. This left knee-swell is also returned to its initial position and normally held there by a spring 153, similar in construction and arrangement to that on the opposite swell. The action of these springs 153 in maintaining the swells in normal position also serves to return the levers 142 to their normal positions, which results in swinging the lever 147 to assume a normal position to hold the bar 50 at a point to obtain a medium loud tone from the instrument.

As before mentioned, a means for regulating the speed of the motor for driving the bow-bands is employed which will now be described, said means being also operable by the knee-swells, as will presently appear. Referring particularly to Figs. 7 and 10 of the drawings, it will be seen, as hereinbefore described, that the knee-swells are provided with extensions 135, projecting to a point within the casing, where each is provided with a pin 154, which pins project into and work within slots 155 in the upper ends of levers 156, which at points intermediate their ends, as at 157, are fulcrumed upon bracket-arms 158, mounted in the instrument-casing, the levers being provided at their lower ends with rubber rollers 159. The brackets just mentioned are provided with arms 160, formed at their free ends with guides 161, in which is slidably disposed a longitudinally-movable bar 162, provided at a point intermediate its ends with a depending arm 163, connected at its lower end to the end of the rod 119 for controlling the brake. This bar 162 is also provided upon its upper side with projections 164 165, which are arranged in the paths of the swing of the levers 156, which engage the said projections to operate the brake in the following manner:

As the knee levers or swells are fulcrumed upon vertical hinges, their rear ends will swing in a direction opposite to that in which the front ends are moved. It follows, therefore, that if the right-hand knee lever or swell be swung to the right to raise the bar 50 and lessen the volume of tone produced by the bow its pin 154 will swing the lever 156 to the left. Hence its roller 159 will be moved to the right, thereby moving rod 119 to the right and forcing piston 116 outward in its housing 115 against the resistance of spring 117, causing the tightening of belt 114, resulting in a reduced speed of the motor. On the other hand, if the left-hand knee-lever be pressed to the left to lower the bar 50 its pin 154 will move to the right, thereby moving the lever 156 to swing its roller 159 out of engagement with the coacting projection on rod 162, thereby permitting springs 117 to draw the piston 116 inward and force rod 119 to the left, thus slackening the belt 114 and permitting the motor to operate at increased speed.

For the purpose of increasing the volume of sound under circumstances rendering the use of the right knee-swell undesirable I provide a means for raising a cover or lid to the instrument-casing to permit the sound to emit therefrom with added intensity. Referring particularly to Figs. 7 and 8 of the drawings, 166 designates a hinged leaf or lid constituting a closure for the upper open portion of the instrument-casing. To the under side of this leaf or lid, adjacent the ends thereof and within the casing, are swiveled in any suitable manner, as at 167, the upper ends of vertical lifting-rods 168, which extend downwardly from the lid to a point adjacent the bottom of the instrument, where they are connected, as at 169, to the ends of oppositely-arranged rocking levers 170. These rocking levers 170 are fulcrumed at points intermediate their ends to studs 171, arranged at points upon the front board of the casing, the inner ends of said levers being pivoted together, as at 172, and secured to one end of a lever 173, as at 174. This lever 173 is fulcrumed at a point intermediate its ends to a stud 175 at the bottom of the casing and at its rear end is movably connected, as at 176, to the upper end of a vertical connecting-rod 177, the lower end of which is pivoted, as at 178, to the rear end of a pedal 179, pivoted in a pedal-support 180. From the above it will be seen that by depressing the free end of the pedal 179 the rear end thereof will be raised to elevate the rod 177 and the rear end of the lever 173, which action depresses the front end of said lever 173 and the meeting ends of the oppositely-disposed levers 170, and raises the outer ends of said levers and the rods 168 to raise the lid 166 a distance controlled by the amount of pressure which is exerted on the pedal 179.

The construction of the pedal-support and the arrangement of the pedals and their structure will now be described. At its lower end the pedal-support is provided with a hollow boxing or casing 181, formed with front and rear alining openings 182, through which the front end and rear ends of the pedals project. Within the boxing 181 is rigidly mounted a transverse horizontal bar 183, provided with spaced collars or flanges 184, between which are loosely fulcrumed for both a rocking and lateral movement the pedals 120ᵃ and 179 heretofore mentioned, the flanges 184 being a sufficient distance apart to permit a slight lateral movement of said pedals on the rod 183. That portion of the boxing 181 located between the front set of openings 182 is formed with a shoulder 185, under which the pedals rest and are held against upward movement and the lid and bowing mechanism maintained at a position to give a medium loud sound. In the rear of the casing 181, at opposite sides thereof, are retractile springs 186, which swing the rear ends of the pedals outwardly to throw the pedals under the shoulders 185 and hold them normally in that position. By the arrangement of the pedal 120ᵃ the bow is held at normal position with relation to the bridge of the viol, and when it is desired to raise the same or increase its distance from the bridge the pedal is depressed, which action through the rod 120 raises the bow the height desired, and to lower the bow the pedal is moved laterally from under the shoulder 185 and permitted to rise by the frame 84 gravitating to its normal position, which lowers the rear end of the pedal through the rod 120 and bowing mechanism.

In operating the lid, which is normally slightly raised, when it is desired to increase the opening in the casing the pedal 179 is depressed, which raises its rear end and through the lever connections elevates the lid. To lower the lid, the pedal 179 is swung from beneath its shoulder 185 and permitted to swing upwardly, whereby the lid will close by gravity, its support provided by the pedal and lever connections being removed.

It will be observed from the construction explained that all the parts are closely in contact to overcome any tendency toward lost motion. The rollers and pulleys and other movable parts will have ball-bearings, as indicated by Fig. 8, and in rear of the position of the viol or violin a sounding-board 148 will be positioned within the casing for obvious reasons. The motor may be of any of the approved forms, either electrical, spring, or fluid.

The stops will also be provided in connection with the improved instrument whereby adjustment of the parts will ensue to regulate the degree of tone to obtain different expressions from "pppp" to "ffff." This will not, however, interfere with the touch, as the resilient limitation interposed between the guide-bar and the keys of the manual permits a greater range of key depression. One of the essential advantages of the improved construction is the ability to operate the violin in different positions, as in ordinary manual violin execution. A further advantage is obtaining expression by "sympathetic touch." As in general organ or piano constructions all concussions will be modified by springs and felt introduced at such points as may be found necessary.

Having thus fully described the invention, what is claimed as new is—

1. In a viol-organ, a viol, a bowing device for each string of the viol, said device passing in front of its coöperative string and rear of the adjacent string, and means for controlling the bowing devices.

2. In a viol-organ, a viol, a bowing device for each string of the viol, said devices operating transversely of the string and each passing in front of its coöperative string and in rear of the adjacent string, and means for controlling the bowing devices.

3. In a viol-organ, a viol, an endless bowing device for each string of the viol, said device passing in front of its coöperative string and in rear of the adjacent string, and means for controlling the bowing devices.

4. In a viol-organ, a viol, endless bowing devices operating transversely of the viol-strings and arranged alternately therewith, and means for operating the bowing devices.

5. In a viol-organ, a viol, continuously-moving endless bowing devices operating transversely of the strings and arranged alternately therewith, said devices being normally out of contact with the string, and means for moving either of said devices into contact with its respective string.

6. In a viol-organ, a viol, endless bowing devices arranged alternately with the strings and normally out of contact with the strings, means for forcing the bowing devices into contact with the strings, and means for controlling said contact-pressure.

7. In a viol-organ, a viol, endless bowing devices coöperating with the strings and normally out of contact therewith, means for forcing the bowing devices into contact with the strings, and means to move the bowing devices lengthwise of the strings.

8. In a viol-organ, a viol, endless bowing devices arranged alternately with the strings, a frame supporting said bowing devices, and means for moving the frame lengthwise of the strings.

9. In a viol-organ, a viol, endless bowing devices arranged alternately of the strings and normally out of contact therewith, means for forcing the bowing devices into contact with the strings, and means for moving the bowing devices lengthwise of the strings.

10. In a viol-organ, a viol, a frame arranged adjacent the viol, endless bowing devices carried by the frame and operative alternately of the viol-strings, and means carried by the frame for supporting the bowing devices, said means being adjustable to vary the relative positions of the bowing devices.

11. In a viol-organ, a viol, a frame supported adjacent the viol, endless bowing devices, one for each string of the viol, means carried by the frame for individually adjusting the bowing devices, and means for operating the bowing devices.

12. In a viol-organ, a viol, a vertically-adjustable frame supported adjacent the viol, endless bowing devices adjustably supported by the frame, and means for operating the bowing devices.

13. In a viol-organ, a viol, endless bowing devices normally out of contact with the viol-strings, means for operating the bowing devices, means for moving the bowing devices into contact with the strings, and means for regulating the contact-pressure of the bowing devices and simultaneously controlling their operative speed.

14. In a viol-organ, a viol, endless bowing devices arranged alternately of and for coöperation with the strings and normally out of contact therewith, means for moving the bowing devices, means for forcing the bowing devices into contact with the strings, and means for controlling the speed of the bowing devices.

15. In a viol-organ, a viol, endless bowing devices arranged alternately of and for coöperation with the strings and normally out of contact therewith, a frame adjustably supporting said bowing devices, means for adjusting the frame lengthwise of the viol-strings, and means for driving all the bowing devices from a single motor.

16. In a viol-organ, a viol, a frame supported adjacent the viol, rollers adjustably supported in the frame, endless bowing devices carried by said rollers and arranged for coöperation with the viol-strings, all of said bowing devices passing around one of said rollers, and means for driving said latter roller.

17. In a viol-organ, a viol, flexible endless bowing devices, one for each string of the viol and normally out of contact therewith, and means coöperating with each bowing device to force said device at a point along its length out of its normal path of travel and into contact with its respective string.

18. In a viol-organ, a viol, endless movable flexible bowing devices for coöperation with the strings of the viol and normally out of contact therewith, means for fingering the strings, and means for simultaneously operating said fingering means and distending the bowing devices to bring them into contact with their strings.

19. In a viol-organ, a viol, continuously-operating endless flexible bowing devices arranged for individual coöperation with each string of the viol and normally out of contact therewith, mechanism for distending and moving the bowing devices through their flexibility into contact with the strings, means for fingering the strings, and keys for simultaneously operating the said mechanism and the fingering means.

20. In a viol-organ, a viol, bowing devices arranged for coöperation with the viol-strings and normally out of contact therewith, keys to force the bowing devices into contact with the strings, and means to regulate the movement of the keys to vary the pressure of the bowing devices on the strings.

21. In a viol-organ, a viol, bowing devices arranged for coöperation with the viol-strings and normally out of contact therewith, keys and connections therefrom operable to force the bowing devices into contact with the strings, and a plate beneath and adjustable toward and from the keys to regulate the range of movement of the keys.

22. In a viol-organ, a viol, bowing devices arranged for coöperation with the strings and normally out of contact therewith, means for continuously operating the bowing devices, keys operable to force the bowing devices into contact with the strings, a plate arranged beneath the keys, means to vertically adjust the plate to vary the movement of the keys, and means to control the speed of the bowing devices.

23. In a viol-organ, a viol, bowing devices arranged for coöperation with the strings and normally out of contact therewith, means for continuously moving the bowing devices transversely of the strings, means to force the bowing devices into contact with the strings, and means to simultaneously regulate both said latter means in a single operation.

24. In a viol-organ, a viol, bowing devices for coöperation with the strings, means for moving said bowing devices continuously, keys for forcing the bowing devices into contact with the strings, a vertically-movable plate arranged beneath the keys, and means to move said plate toward the keys and simultaneously reduce the speed of the bowing devices.

25. In a viol-organ, a viol, an individual bowing device for each string, a series of vertically-arranged fingering means for each string, keys to operate the fingering means, and mechanism to simultaneously operate the fingering means of adjacent series in the single operation of a key.

26. In a viol-organ, a viol, an individual bowing device for each string, a vertically-arranged series of fingering devices for each string, a key to operate the fingering devices, and mechanism intermediate the key and fingering devices and operative to effect two of said fingering devices in a single movement of the key.

27. In a viol-organ, a viol, bowing devices for the strings, a key-plate arranged adjacent the strings, fingering means operative through said plate and supported thereby, a key arranged to normally operate each of said fingering means, and manually-operable means to connect said key with a plurality of said fingering means.

28. In a viol-organ, a viol, a bowing device arranged for coöperation with each string and normally out of contact therewith, bars slidably supported in the frame and movable to force the bowing devices into contact with the strings, vertically-movable keys, and mechanism intermediate the keys and bars to operate the latter in the movement of the former.

29. In a viol-organ, a viol, a bowing device arranged for coöperation with each string and normally out of contact therewith, a bar for each bowing device movable laterally of the organ, operating-keys, and mechanism between the keys and bars whereby the operation of the former will move the latter, a plurality of keys having connection with each of the bars.

30. In a viol-organ, a viol, a bowing device arranged for coöperation with each string and normally out of contact therewith, keys operable to force the bowing devices into contact with the strings, and mechanism to operate a plurality of said bowing devices in the movement of a single key.

31. In a viol-organ, a viol, a bowing device arranged for coöperation with each string and normally out of contact therewith, a movable bar for each bowing device and operative to force the bowing device into contact with the respective string, a key for moving said bar, and means whereby the key may be brought into operative connection with a plurality of said bars.

32. In a viol-organ, a viol, a bowing device arranged for coöperation with each string of the viol and normally out of contact therewith, a movable bar for each bowing device, a roller arranged adjacent to each bowing device and forced into contact therewith in the movement of the bar, a key for operating the bar, and means for varying the movement of the key.

33. In a viol-organ, a viol, a bowing device arranged for coöperation with each string and normally out of contact therewith, a movable bar for each bowing device, a roller supported adjacent the bowing device and movable in the operation of the bar to force the bowing device into contact with the string, operating-keys, means connecting the keys and bars, a plurality of keys being connected to each bar, and means to regulate the movement of the keys to vary the pressure of the roller against the bowing device.

34. In a viol-organ, a viol, bowing devices for the strings normally out of contact therewith, means for forcing the bowing devices into contact with the strings, operating-keys for said means, and an adjustable device to regulate the range of movement of said keys.

35. An endless bowing device comprising a base portion formed of two layers cemented together, and a horse-hair surface, the ends of the individual hairs being secured between the layers of the base.

36. In a viol-organ, a viol, bowing-belts having hair-surface to engage the strings thereof, and means for adjusting the belts lengthwise of the strings.

37. In a viol-organ, a viol, continuously-movable endless bowing devices, one for each string of the viol and normally out of contact therewith, and means coöperating with each bowing device to force said device into contact with its respective string.

38. In a viol-organ, a viol, a series of continuously-movable endless bowing devices, one for each string of the viol, and out of contact with the viol, means for continuously driving said bowing devices in unison, and means for independently forcing the bowing devices into contact with their respective strings.

39. In a stringed musical instrument, a series of strings, a series of bowing devices, one for each string and normally out of contact with its coöperating string, each bowing device comprising an endless traveling belt, and means for deflecting each belt at a determined point for projecting the same into contact with its string.

40. In a stringed instrument, movable flexible bowing devices, one for each string and normally out of contact therewith, and means for exerting pressure upon each bowing device to displace it through its flexibility from its normal path of travel and bring it into contact with its coacting string.

41. In a stringed instrument, movable flexible bowing devices, one for each string and normally out of contact therewith, means for exerting pressure upon each bowing device to displace it at a determined point through its flexibility from its normal path of travel to bring it into contact with the coacting string, and means for varying such pressure.

In testimony whereof I affix my signature in presence of two witnesses.

ERNEST RINGER.

Witnesses:
    T. E. COYLE,
    J. C. ROTH.